United States Patent
Donly et al.

(10) Patent No.: US 11,280,905 B2
(45) Date of Patent: Mar. 22, 2022

(54) UNDERWATER IMAGING SYSTEM WITH MULTIPLE CONNECTED AUTONOMOUS UNDERWATER VEHICLES

(71) Applicant: Seagate Technology LLC, Fremont, CA (US)

(72) Inventors: Charles Donly, Minneapolis, MN (US); Jon Trantham, Chanhassen, MN (US)

(73) Assignee: SEAGATE TECHNOLOGY LLC, Fremont, CA (US)

(*) Notice: Subject to any disclaimer, the term of this patent is extended or adjusted under 35 U.S.C. 154(b) by 208 days.

(21) Appl. No.: 16/859,306

(22) Filed: Apr. 27, 2020

(65) Prior Publication Data
US 2020/0348414 A1    Nov. 5, 2020

Related U.S. Application Data

(60) Provisional application No. 62/843,159, filed on May 3, 2019.

(51) Int. Cl.
| | |
|---|---|
| *G01S 15/89* | (2006.01) |
| *H04N 13/239* | (2018.01) |
| *G01S 7/00* | (2006.01) |
| *B63G 8/39* | (2006.01) |
| *B63G 8/00* | (2006.01) |
| *G01S 7/54* | (2006.01) |

(52) U.S. Cl.
CPC .............. *G01S 15/89* (2013.01); *B63G 8/001* (2013.01); *B63G 8/39* (2013.01); *G01S 7/003* (2013.01); *G01S 7/54* (2013.01); *H04N 13/239* (2018.05); *B63G 2008/004* (2013.01)

(58) Field of Classification Search
CPC .... H04N 13/106; H04N 13/239; B63G 8/001; B63G 8/39; B63G 2008/004; G01S 15/89; G01S 7/6245; G01S 7/54; G01S 7/003

See application file for complete search history.

(56) References Cited

U.S. PATENT DOCUMENTS

| | | | |
|---|---|---|---|
| 5,995,882 A | 11/1999 | Patterson et al. | |
| 8,346,415 B1* | 1/2013 | Hinnant, Jr. ......... | G05D 1/0692 701/21 |
| 9,229,108 B2 | 1/2016 | Debrunner et al. | |

(Continued)

FOREIGN PATENT DOCUMENTS

| | | |
|---|---|---|
| WO | 2011143622 A2 | 11/2011 |
| WO | 2018231273 A1 | 12/2018 |

OTHER PUBLICATIONS

Rumson, Al, "Mapping the Deep Ocean with Multiple AUVs", Ocean Infinity's Seabed Exploration Project, dated Apr. 24, 2018, 5 pages.

(Continued)

*Primary Examiner* — Isam A Alsomiri
*Assistant Examiner* — Amie M Ndure
(74) *Attorney, Agent, or Firm* — Westman, Champlin & Koehler, P.A.

(57) ABSTRACT

A method of stereoscopic mapping an underwater location includes determining a relative position and relative distance between two separate sensors on separate underwater platforms. Each of the two separate sensors scans a same underwater feature from its respective determined relative position. A stereoscopic image of the underwater feature is created from the two scanned images.

20 Claims, 5 Drawing Sheets

(56) References Cited

U.S. PATENT DOCUMENTS

| | | | |
|---|---|---|---|
| 10,223,706 B1* | 3/2019 | Cahill | G06F 16/955 |
| 2002/0071345 A1* | 6/2002 | Chiang | H01Q 3/2682 |
| | | | 367/138 |
| 2006/0008137 A1 | 1/2006 | Nagahdaripour et al. | |
| 2011/0213700 A1* | 9/2011 | Sant'Anselmo | G06Q 20/10 |
| | | | 705/39 |
| 2015/0078123 A1* | 3/2015 | Batcheller | G01S 15/86 |
| | | | 367/7 |
| 2018/0093171 A1* | 4/2018 | Mallinson | A63F 7/0604 |
| 2018/0259339 A1* | 9/2018 | Johnson | G05D 1/0206 |
| 2019/0127034 A1 | 5/2019 | Larson et al. | |
| 2019/0172348 A1* | 6/2019 | Rivers | G05D 1/0094 |
| 2019/0251356 A1* | 8/2019 | Rivers | G06T 3/60 |
| 2019/0303759 A1* | 10/2019 | Farabet | G06K 9/4628 |

OTHER PUBLICATIONS

Pohajdak, Timothy, "Change Detection Of Sea Floor Environment Using Side Scan Sonar Data for Online Simultaneous Localization and Mapping on Autonomous Underwater Vehicles", Thesis Article, dated Apr. 2016, 74 pages.

Oskard, David et al., "Real-time Algorithms and Data Structures for Underwater Mapping", Virginia Polytechnic Institute, dated 1990, 17 pages.

Jaulin, Luca, "A Nonlinear Set Membership Approach for the Localization and Map Building of Underwater Robots", IEEE Transactions On Robotics, vol. 25, No. 1, dated Feb. 2009, 11 pages.

* cited by examiner

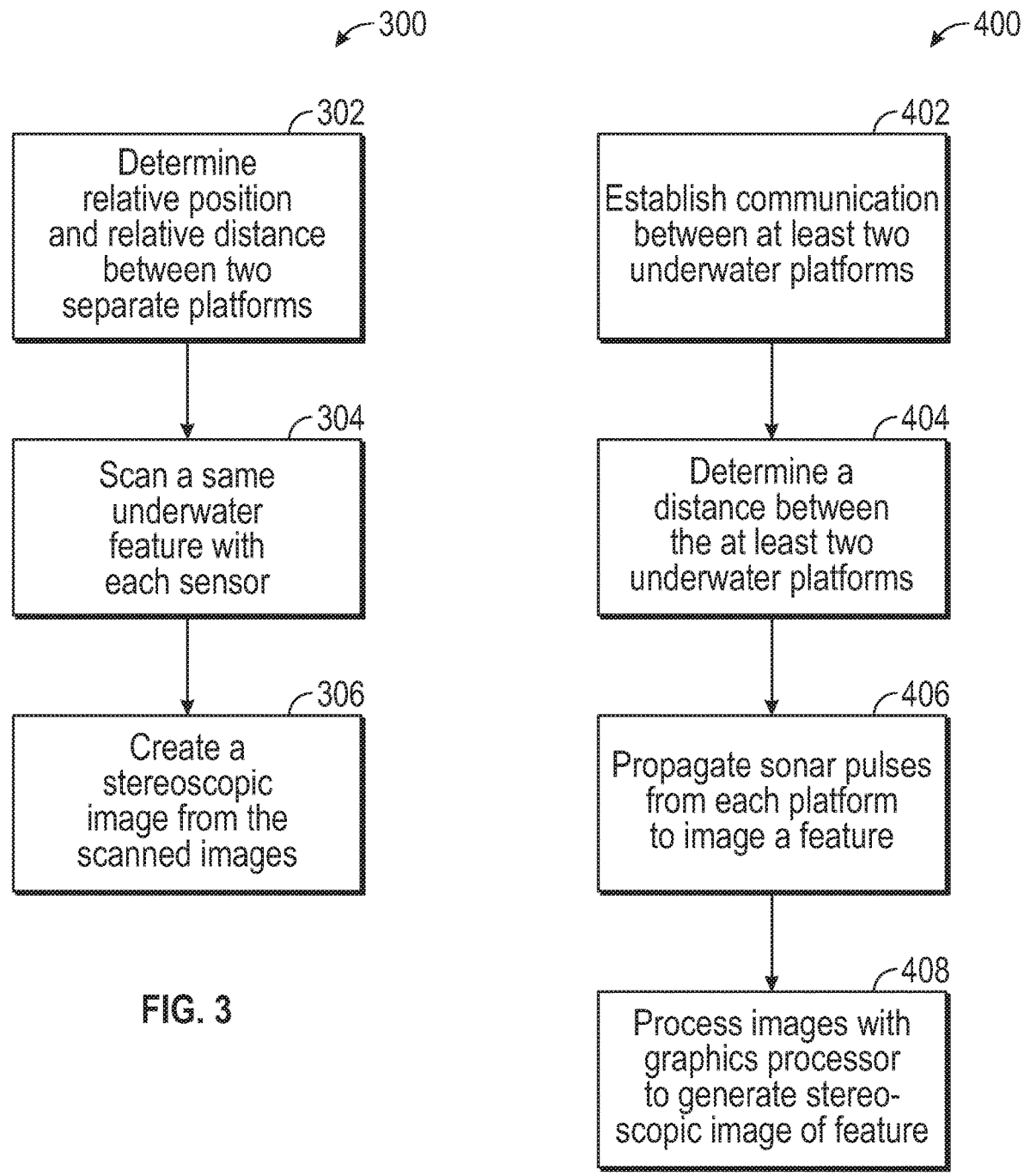

UNDERWATER IMAGING SYSTEM WITH MULTIPLE CONNECTED AUTONOMOUS UNDERWATER VEHICLES

CROSS-REFERENCE TO RELATED APPLICATION

This non-provisional utility patent application claims the benefit of U.S. Provisional Patent application No. 62/843,159, filed on May 3, 2019, the entire content of which is hereby incorporated by reference.

SUMMARY

In one embodiment, a method of stereoscopic mapping an underwater location includes determining a relative position and relative distance between two separate sensors on separate underwater platforms. Each of the two separate sensors scans a same underwater feature from its respective determined relative position. A stereoscopic image of the underwater feature is created from the two scanned images.

In another embodiment, a method of mapping an underwater environment includes establishing communication between at least two underwater platforms, each underwater platform having a sonar system. A distance between the at least two underwater platforms is determined. Sonar waves are propagated from the sonar system of each of the at least two underwater platforms to image a feature in the underwater environment. Sonar images from each of the at least two underwater platform sonar systems are processed with a graphics processor to generate a stereoscopic image of the underwater feature.

In another embodiment, an underwater platform includes a platform body with a propulsion system, a communication system, an internal navigation system, and a computer control for directing platform operation, and a sonar system. The computer control is configured to establish communication between the platform and another separate underwater platform. The computer control is further configured to determine a distance between the two underwater platforms, and to propagate sonar waves from the sonar system to image a feature in the underwater environment. The computer control directs processing of sonar images from each of the at least two underwater platforms with a graphics processor to generate a stereoscopic image of the underwater feature.

This summary is not intended to describe each disclosed embodiment or every implementation of stereoscopic underwater imaging as described herein. Many other novel advantages, features, and relationships will become apparent as this description proceeds. The figures and the description that follow more particularly exemplify illustrative embodiments.

BRIEF DESCRIPTION OF THE DRAWINGS

FIG. 3 is a flow chart diagram of a method according to an embodiment of the present disclosure;

FIG. 4 is a flow chart diagram of a method according to another embodiment of the present disclosure;

DETAILED DESCRIPTION OF ILLUSTRATIVE EMBODIMENTS

Figure 1:
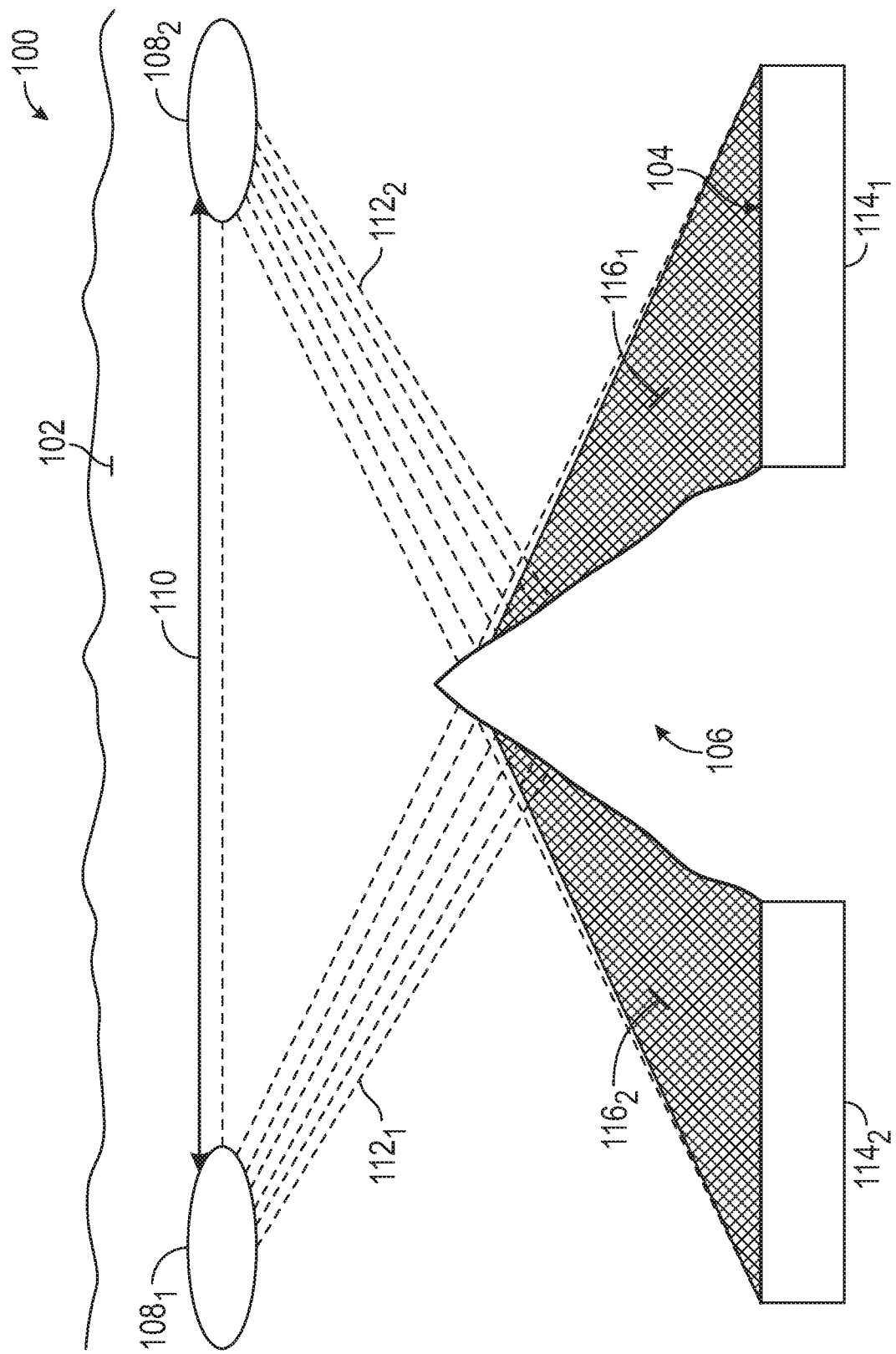
FIG. 1 is a diagram illustrating mapping according to an embodiment of the present disclosure.

Embodiments of the present disclosure provide multiple platforms with sonar, which are connected to each other using underwater communications. The relative positions and distances between platforms are known. The platforms are used for capture and collection of image data from a variety of positions, such as different depths or angles from an object or seafloor that is being imaged. Data storage solutions within the platforms provide the ability to enhance image resolution using storage architectures including at least one of metadata, objects, and storage computing resources. Sonar having a lower price than typical high end sonar may be used, such as side-scan sonar. An application of graphics processing power to harness low power/low cost sensors in the sonar wavelength of the energy spectrum and an application of short range communication may be used in one embodiment to establish a stereo image of the seabed floor using multiple platforms. In one embodiment, the platforms are autonomous underwater vehicles (AUVs).

It should be noted that the same reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Many underwater mapping systems use two dimensional mapping. These two dimensional mapping systems typically use overlapping images to stitch together an image that covers a larger area than any one individual image. In such a system, only a small amount of overlap is present between images. The images are used to create a wider two dimensional map area than an individual image can encompass. Some systems use panoramic imaging devices to capture an image in some larger portion of a circle, such as a 360 degree panoramic image. Such systems do not provide stereoscopic imaging, only a wider field of view.

Underwater imaging of sea- and other water-floors (hereinafter "seafloor") can be problematic when approached as a two dimensional solution. Topography on the seafloor may create shadows or areas of lower resolution that create problems for imaging and metrology. While a human eye and brain may interpret shadows into approximations of true three-dimensional images on viewing, a computer cannot make that distinction as easily. Synthetic aperture sonar may increase the abilities of scanning, but at a cost substantially higher (on the order of 10-20x) than other types of sonar, such as side-scan sonar. Further, use of a single point imaging source for imaging and/or mapping of features on a seafloor, even with synthetic aperture sonar, typically focuses in one dimension and cannot provide three dimensional resolution without multiple passes.

Since synthetic aperture mapping sonar (SAMS) uses larger amounts of power than other sonar, mission times for AUVs with SAMS may be reduced due to larger power consumption. Further, since AUVs may have limited ranges, they may? use multiple passes which limits the amount of area that may be mapped. Even when a single platform such as a single AUV has two imaging sources, the distance between the sources is small and fixed.

Synthetic aperture sonar is usually focused in one dimension and sacrifices viewable angle and resolution in other angles or axes. Problems with the use of synthetic aperture sonar and with multiple pass mapping procedures are numerous, and include by way of example only and not by way of limitation, the following:

1. Terrain may require a single AUV to make multiple passes for one feature to resolve the details of the feature. Because of this, the nautical miles to be mapped or covered may be limited on missions. This is directly related to cost and time of data collections. Limited coverage creates higher costs and longer collection times.

2. SAMS are 10-20x the cost of side scan or subbottom profilers.

3. SAMS are also high power consumers, which limits the mission time for an AUV employing SAMS.

4. Features identified using a single AUV are in one dimension, and additional efforts etc. are used to resolve estimated heights and make-up of features based on shadows cast from the single source of sonar.

5. Multiple sonar arrays can only be focused in one dimension (e.g. towed array sonar).

Synthetic aperture sonar can use multiple pings focused on the same image to improve image quality, versus multiple images from multiple sonar sources at the same time.

For underwater imaging, the seafloor of a search area for mapping may be hilly and uneven, with various anomalies and features. Such a seafloor can disrupt an AUV's capability to thoroughly sweep the area. Topography on the seafloor creates a shadow problem for metrology and imaging using traditional two dimensional or panoramic mapping. Embodiments of the present disclosure use stereo mapping to overcome the problems with two dimensional and/or panoramic mapping. Further, stereo mapping helps to overcome issues with what is considered three dimensional mapping, but which it typically just panoramic mapping, or interpretation of shadows from a sonar image that may not be accurately interpreted by computers, but only roughly by the human eye.

In one embodiment, mapping according to an embodiment 100 of the present disclosure is shown in FIG. 1. The mapping system is deployed in a body of water 102, such as an ocean. The seafloor 104 has a feature 106 thereon which is to be mapped. Feature 106 may be a naturally occurring seafloor element, a shipwreck, debris, or the like. A plurality of AUVs $108_1$ and $108_2$ are spaced apart a known distance 110. The known distance 110 is a relative distance between the AUVs $108_1$ and $108_2$. This distance is established by the AUVs knowing their position and having communication therebetween to establish the distance. The AUVs are synchronized to a time in one embodiment so that the location of one AUV $108_1$ relative to another AUV $108_2$ is known along with the distance between the AUVs and the time. Each AUV $108_1$, $108_2$ has an imaging system, such as a sonar system, that sends a series of sonar pulses $112_1$, $112_2$. A projection on the seafloor 104 of the sonar field of view of the pulses $112_1$ is shown at $114_1$. A projection on the seafloor 104 of the sonar field of view of the pulses $112_2$ is shown at $114_2$. Some or all of the sonar pulses $112_1$ and $112_2$ hit feature 106. The sonar pulses $112_1$, $112_2$ that are blocked leave a shadow $116_1$ and $116_2$ on the seafloor 104 behind the feature 106.

Each AUV in one embodiment carries a graphics processor for interpreting sonar images. Using the multiple individual sonar images obtained by the AUVs 108 and the graphics processing, images at different frequencies (usually in the 2-15 Kilohertz (KHz) range for underwater applications) are stitched together using, for example, identifiable overlapping features. Resolution is improved using various averaging and convergent mathematical solutions. In this way, a stereoscopic image of the feature 106 is obtained using multiple individual AUVs at known positions and relative distance from each other.

The mapping system of FIG. 1 builds on lower cost individual sonar sensors and graphics processors to create a high resolution sonar image that can be scaled for power consumption or resolution related goals. In one embodiment, the initial graphics processing yields a lower resolution stereoscopic image than a final image. In one embodiment, high resolution processing is performed offline to conserve power for AUV operation and imaging. Utilizing multiple connected AUVs having known locations, known relative distances to each other, and underwater communications (e.g., acoustic modems, navigational aids such as Doppler velocity laser (DVL) or inertial navigation) are able to use sonar capture to create a stereo image of a seafloor 104 or objects 106 thereon from data collected on the separate AUVs.

In one embodiment, multiple AUVs 108 can be arranged in different orientations (e.g., different vertical positions, different horizontal distances from a feature or the seafloor, or the like) to resolve desired information from features 106. Desired information in one embodiment includes but is not limited to height, width, and volume of the feature 106 on the seafloor 104. In one embodiment, therefore, the AUVs 108 are a known distance apart, and at a known relative location, focusing on the same feature from a different angle, depth, perspective, or the like.

In some embodiments, the each AUV of the plurality of AUVs contains a data storage device or devices. The device(s) are configured in one embodiment to efficiently perform imaging when the AUVs are separated by a known distance, are at known locations, and at a known common time. In one embodiment, a method of image resolution enhancement is performed by selecting certain data storage architectures with metadata, objects or storage compute resources to operate on the incoming data streams from the imaging systems (e.g., sonar).

According to an embodiment of the present disclosure, creation of stereo imaging as described herein relies on but is not limited to the following for establishing timing and location of sonar imaging:

1. Precision time keeping on each AUV 108 that is synchronized to a common clock before the start of a dive, with existing communication links to data from one of the existing atomic clocks.

2. Low bandwidth communication between AUVs 108 is initiated and takes place to establish relative distance and time between the sonar sensors of the AUVs 108 (e.g., AUV 108₁, 108₂, 108₃, . . . , 108n). This distance is then used in the postprocessing of the sonar data.

3. Offsets in depth for different AUVs 108 may be corrected by using pressure sensors in each AUV to correct for differences in AUV depth during post processing of the gathered sonar data.

4. Overall location, as opposed to only relative location between AUVs, of the features and/or seafloor that are the subject of the sonar images may rely in one or more embodiments on:

establishing AUV and/or feature location with global positioning system (GPS) before diving.

using inertial navigation sensors in each AUV 108.

correcting for errors by locking onto a surface floor (usually about 100 meters above the sea floor) with DVL (Doppler velocity laser) in each AUV 108.

enhancing location awareness by having a network of positioning aids such as but not limited to surface ships, location buoys, and towed arrays.

5. AUVs in one embodiment have data storage devices that store raw sonar information for retrieval and post-processing (e.g., via a Kalman filter) to cancel and compensate for variations in ocean density, temperature, etc. and to determine the precise position of the AUVs and their images. This storage is in one embodiment on a storage device such as a hard disk drive (HDD), a solid state drive (SSD), or a similar device with associated customized file system architectures tuned for data of this nature from the AUV sonar and other sensors. In some embodiments, objects to collect the various types of data together in a logical way are used to facilitate efficient post-processing or concurrent-processing.

Figure 2:
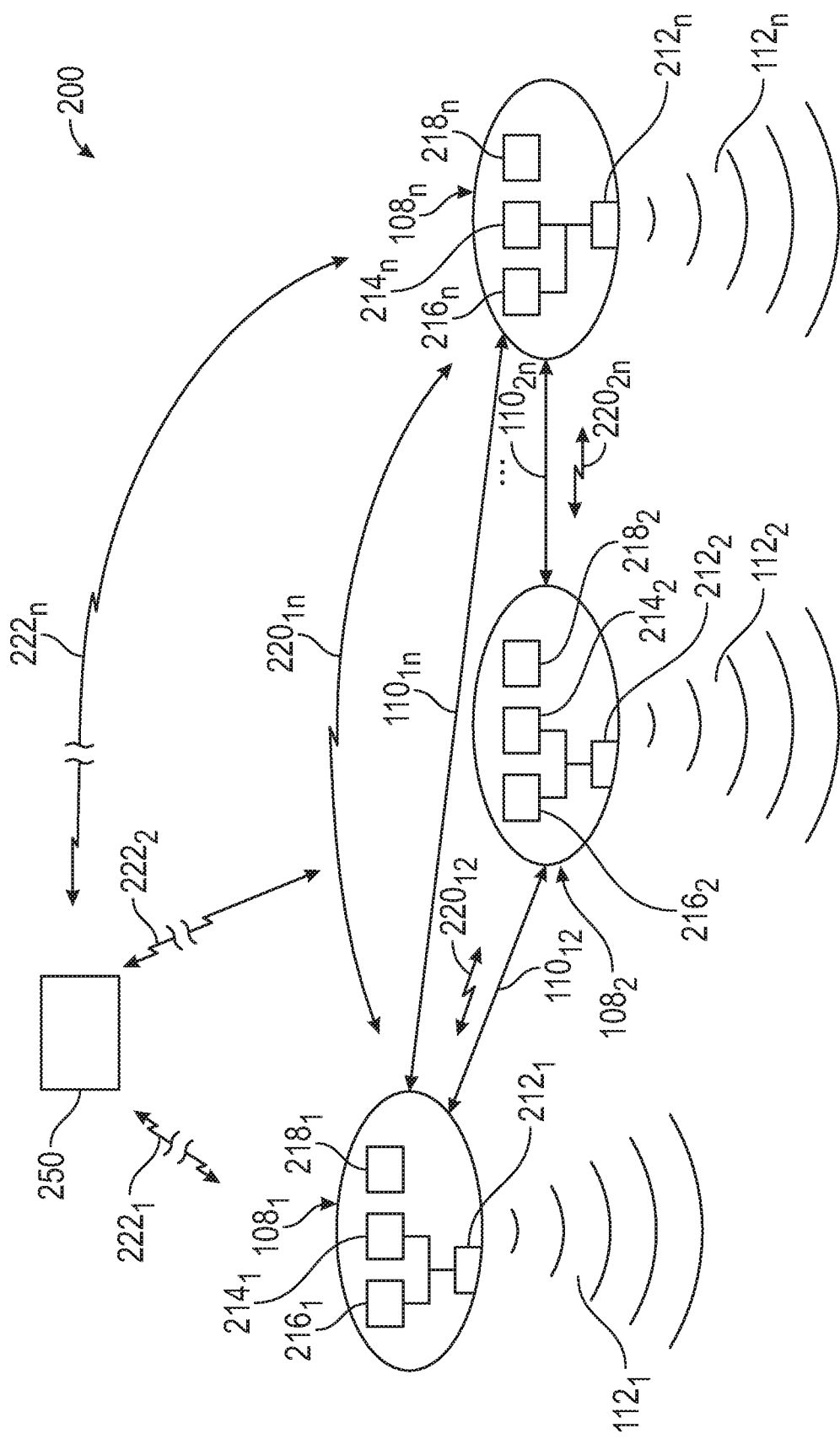
FIG. 2 is a diagram illustrating am underwater mapping system according to an embodiment of the present disclosure.

FIG. 2 is a block diagram of a mapping system 200 according to an embodiment of the present disclosure. System 200 is disposed in a body of water, such as an ocean, lake, canal, or the like. System 200 comprises in one embodiment a plurality of AUVs 108₁, 108₂, . . . , 108n, arranged in an array. Each AUV has a known distance between it and the other AUVs. The distance between AUVs 108₁ and 108₂ is 110₁₂. The distance between AUVs 108₁ and 108n is 110₁n. The distance between AUVs 108₂ and 108n is 110₂n. Communication between the AUVs is on communication network 220. Communication may be between individual AUVs, or as a part of a mesh network of communications. Communication between AUVs 108₁ and 108₂ is shown as 220₁₂. Communication between AUVs 108₁ and 108n is shown as 220₁n. Communication between AUVs 108₂ and 108n is shown as 220₂n.

Each AUV 108 includes in one embodiment a vehicle body with a propulsion system, a communication system, an internal navigation system, and a computer-control for directing vehicle operation, generally shown as 218₁, 218₂, . . . , 218n although it should be understood that the systems may be separated or combined without departing from the scope of the disclosure. Each AUV has its own sonar equipment 212₁, 212₂, . . . , 212n sending sonar pulses 112₁, 112₂, . . . , 112n. Each AUV 108 also has its own data storage device 214₁, 214₂, . . . , 214n, and in one embodiment its own graphic processing unit 216₁, 216₂, . . . , 216n.

Communication (e.g., communication 220₁₂, 220₁n, . . . , 220₂n) is established between the AUVs to establish an accurate separation (distance 110) between the sonar sensors 212 collecting sonar information. Using the known relative distance(s) between AUVs, the multiple data streams are then combined to create a 3D resolved output via geometric triangulation in one embodiment. A graphics processor 216 in one of the AUVs may be designated as the combination location in one embodiment. In another embodiment, each AUV 108 sends information about its received data stream, along with position, relative distance, and time to a separate graphics processing unit 250, over a communication connection 222. The communication network 222₁ is from AUV 108₁ to the unit 250. The communication network 222₂ is from AUV 108₂ to the unit 250. The communication network 222n is from AUV 108n to the unit 250.

The distance between the AUVs is used in one embodiment to improve stereoscopic 3D resolution of features of interest. The amount of improvement may be limited by the capability of a line of sight acoustic modem used in one embodiment for communication between AUVs. Transmission in water for low cost acoustic modems may be limited to 400 meters or less. Some acoustic modems can transmit up to in excess of 25 kilometers depending upon the frequency of communication. The use of communication to know relative distances between AUVs allows for the creation of a virtual sonar array system with a larger aperture than would otherwise be available for a given size of an AUV.

In one embodiment, the AUVs 108 are arrayed in ocean locations, but are movable and have communication capabilities networked with other AUVs in the array. This ability to move autonomously, along with communication multiple AUVs to know their relative positions and distance apart, allows for positioning individual AUVs to properly image seafloor features from multiple angles, positions, depths, etc. at the same time.

While AUVs have been described with respect to the embodiments of the present disclosure, it should be understood that other forms of underwater vehicles and platforms may be used with embodiments of the present disclosure without departing therefrom. For example only and not by way of limitation, embodiments of the present disclosure may be practiced on platforms including but not limited to AUVs, remotely operated vehicles (ROVs), submarines, surface towed arrays, or the like, without departing from the scope of the disclosure.

Stereo imaging underwater according to an embodiment of the present disclosure includes operating with a known distance between sonar imaging devices (in one embodiment AUVs). Accuracy for 3D imaging underwater depends on knowing the distance between the imaging systems of the AUVs, using in one embodiment side aperture sonar (synthetic or regular) and communication between two or more platforms with some low data rate communications. This allows the platforms to stay in synch with each other with respect to distance. Timing is accomplished using high accuracy internal navigation clocks. When the time is known, and the distance the platforms are apart is known, sonar images taken of the same feature underwater may be resolved from what is imaged at the same time. Knowing time accurately, and relative distance between platforms, allows for the resolution of images in stereoscopic form.

Placement of imaging sonar devices at a distance apart that cannot be done efficiently on a single platform allows for the operation of the embodiments of the present disclosure. Using two platforms separated by a known distance allows for the stereoscopic imaging of underwater features in a new way. Larger spacing between imaging devices than are present on single platform devices allows for extension of distance between image acquiring equipment (e.g., sonar), and therefore extends the range by which stereo imaging or enhancement of imaging is available.

FIG. 3 illustrates a method 300 according to an embodiment of the present disclosure. Method 300 comprises, in one embodiment, determining a relative position and relative distance between two separate sensors on separate underwater platforms in block 302. Each of the two separate sensors scans a same underwater feature from the two determined relative positions in block 304. In block 306, a stereoscopic image of the underwater feature is created from the two scanned images.

FIG. 4 illustrates a method 400 according to another embodiment of the present disclosure. Method 400 comprises, in one embodiment, establishing communication between at least two underwater platforms in block 402. Each underwater platform has a sonar system. In block 404, a distance between the at least two underwater platforms is determined. Sonar pulses are propagated from the sonar system of each of the at least two underwater platforms to image a feature in the underwater environment in block 406. Sonar images from each of the at least two underwater platform sonar systems are processed with a graphics processor to generate a stereoscopic image of the underwater feature in block 408.

Separate platforms such as are described herein allows for the operation of stereoscopic sonar imaging of underwater features 106 over relatively long ranges, substantially longer than use of multiple sonar systems on a single platform such as an AUV, ROV, or the like, and substantially longer than optical imaging such as cameras, LIDAR, or the like, which do not have range underwater sufficient to image from any distance. While LIDAR can carry more information, its transmission capabilities are quite limited, especially in deep dense water. Graphics processing on each underwater platform allows for the generation of at least low resolution stereoscopic imaging in real time, or substantially in real time, that is, in a few seconds or minutes, as opposed to hours of post-processing to generate images. Higher resolution images may be created when platform resources are available, or may be offloaded to a separate graphics processing system for generation of enhanced resolution imaging.

While lower cost sonar solutions have been discussed herein with respect to the various embodiments, it should be understood that different types of sonar may be used without departing from the scope of the disclosure. For example, different sonar types including but not limited to synthetic aperture sonar (SAS), side scan sonar, towed array sonar, multibeam echosounding (MBES) or the like may be used in embodiments of the present disclosure without departing from the scope thereof. The multiple platform systems of the present disclosure allow point sources in two known relative locations at a known relative distance therebetween and a known time to provide stereoscopic imaging of underwater features.

Figure 5:
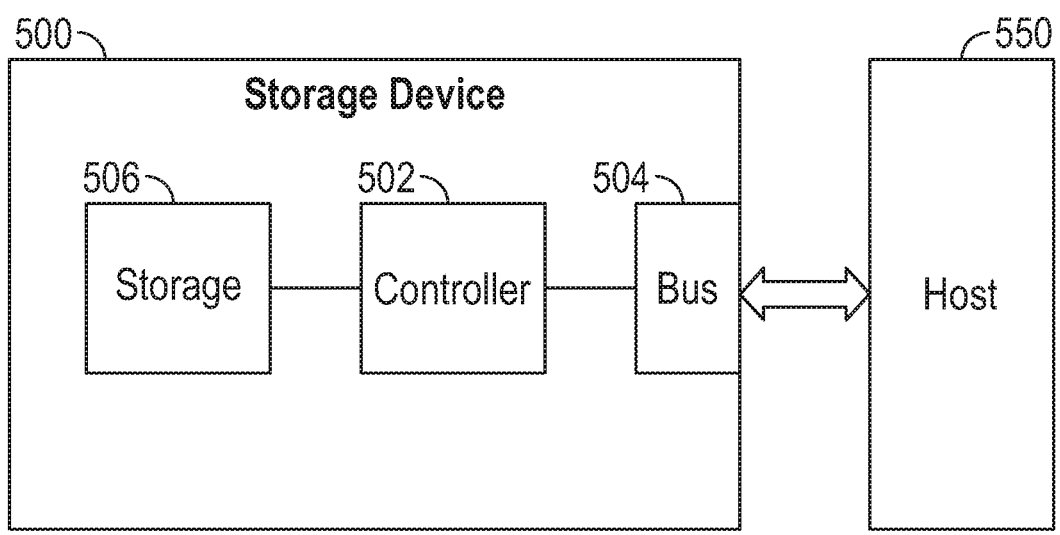
FIG. 5 is a block diagram of a data storage device on which embodiments of the present disclosure may be used.

Referring now to FIG. 5, a simplified block diagram of a storage system 500 on which embodiments of the present disclosure may be practiced is shown. Storage system 500 may be a HDD with platters, a read head, and associated controllers. System 500 may include, by way of example, a controller 502 coupleable via a bus 504 or the like to a host system 550, where the host system 550 may provide power over the bus 504 or through a separate power bus (not shown), and a storage component 506 (such as a spinning disk or platter of disks). A graphics processor may be embodied within the storage device as computer readable instructions thereon for performing graphics processing. Alternatively, a separate graphics processor may be used.

Figure 6:
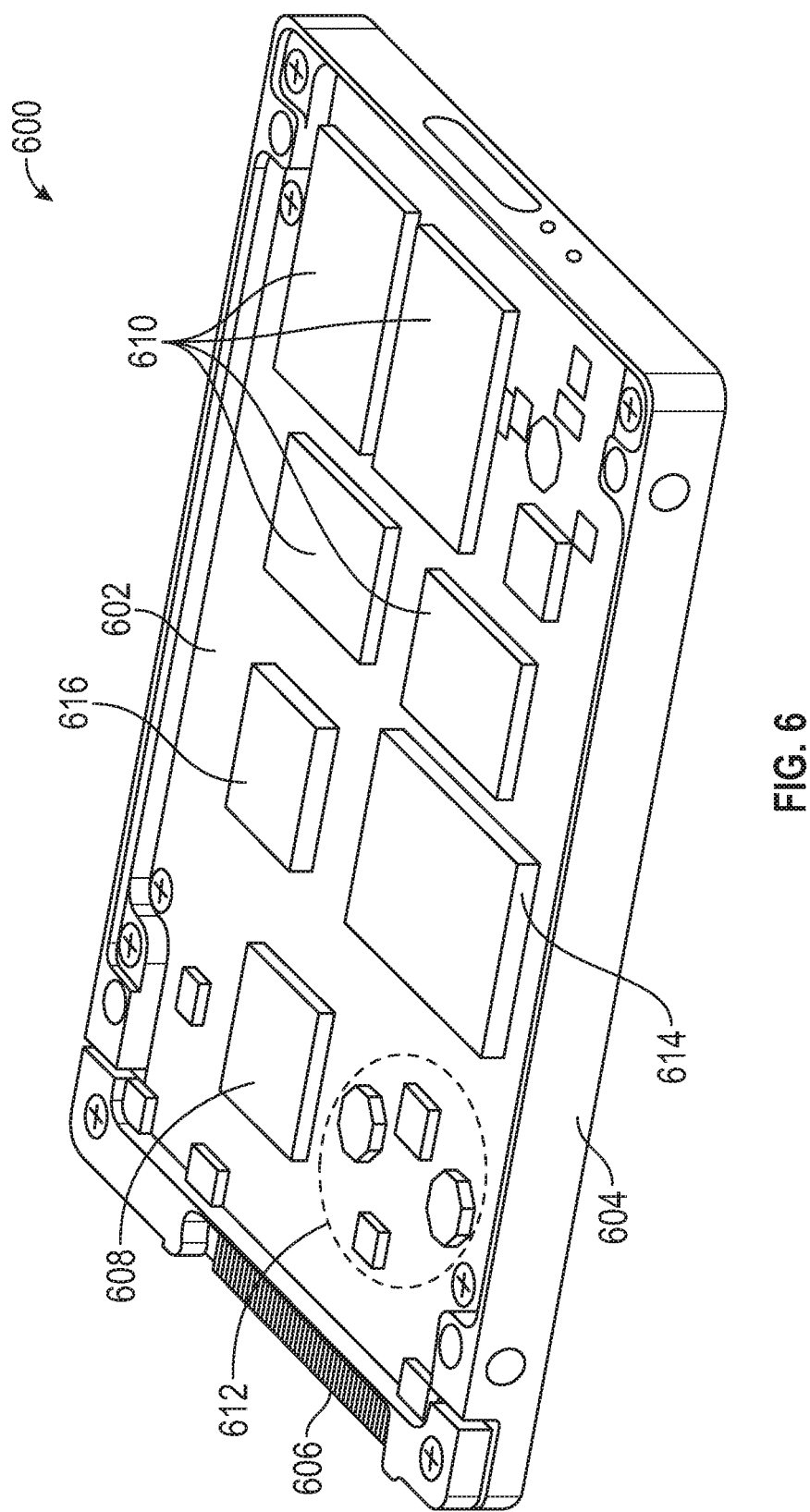
FIG. 6 is an oblique view of a solid state drive (SSD) on which embodiments of the present disclosure may be used.

FIG. 6 illustrates an oblique view of a solid state drive (SSD) 600 in accordance with a system embodying the methods described herein may be used. SSD 600 includes one or more printed circuit boards (PCBs) or circuit card assemblies 602 and typically includes a protective, supportive housing 604, and one or more interface connectors 606. SSD 600 further includes a controller application specific integrated circuit (ASIC) 608 or field programmable gate array (FPGA), one or more non-volatile memory devices 610, and power regulation circuitry 612. The memory devices 610 are essentially the SSD's data storage media. SSD 600 may include erasure blocks as the physical storage locations within memory device 610, which may include Flash memory devices, for example. In some applications, SSD 600 further includes a power-backup energy storage device, such as a super-capacitor 614.

In accordance with certain aspects, the SSD 600 includes the circuit card assembly 602 that includes a connector 606 for connection to a host computer (not shown). In accordance with certain aspects, the connector 606 includes a NVMe (non-volatile memory express), SCSI (small computer system interface), SAS (serial attached SCSI), FC-AL (fiber channel arbitrated loop), PCI-E (peripheral component interconnect express), IDE (integrated drive electronics), AT (advanced technology), ATA (advanced technology attachment), SATA (serial advanced technology attachment), IEEE (institute of electrical and electronics engineers)-1394, USB (universal serial bus) or other interface connector adapted for connection to a host computer. A graphics processor may be embodied within the storage device as computer readable instructions thereon for performing graphics processing. Alternatively, a separate graphics processor may be used.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of stereoscopic mapping an underwater location, comprising:
   determining a relative position and relative distance between two separate sensors on two separate underwater platforms;
   scanning with the two separate sensors a same underwater feature from the two determined relative positions; and
   creating a stereoscopic image of the underwater feature from the two scanned images.

2. The method of claim 1, wherein scanning with sensors comprises scanning with sonar to generate sonar images.

3. The method of claim 1, wherein processing sonar images is accomplished using a graphics processor on one of the two underwater platforms.

4. The method of claim 3, wherein graphics processing on one of the at least two underwater platforms is performed at a first resolution.

5. The method of claim 4, and further comprising additional graphics processing, wherein additional graphics processing is at a second resolution higher than the first resolution.

6. The method of claim 1, wherein processing sonar images is accomplished using a graphics processor on an external platform to the two underwater platforms.

7. A method of mapping an underwater environment, comprising:
   establishing communication between at least two underwater platforms, each underwater platform having a sonar system;
   determining a distance between the at least two underwater platforms;
   propagating sonar waves from the sonar system of each of the at least two underwater platforms to image a feature in the underwater environment; and
   processing sonar images from each of the at least two underwater platform sonar systems with a graphics processor to generate a stereoscopic image of the underwater feature.

8. The method of claim 7, wherein processing sonar images is accomplished using a graphics processor on a one of the at least two underwater platforms.

9. The method of claim 8, wherein graphics processing on a one of the at least two underwater platforms is performed at a first resolution.

10. The method of claim 9, and further comprising additional graphics processing, wherein additional graphics processing is at a second resolution higher than the first resolution.

11. The method of claim 9, and further comprising improving resolution using averaging and convergent mathematical solutions.

12. The method of claim 7, wherein processing sonar images is accomplished using a graphics processor on an external platform to the at least two underwater platforms.

13. The method of claim 7, wherein images are taken at different frequencies.

14. The method of claim 13, wherein images are taken at frequencies ranging from about 2 kilohertz to about 15 kilohertz.

15. The method of claim 7, wherein images are stitched together using identifiable overlapping features of the underwater feature.

16. An underwater platform, comprising:
   a platform body with a propulsion system, a communication system, an internal navigation system, and a computer control for directing platform operation; and
   a sonar system;
   wherein the computer control is configured to:
      establish communication between the platform and another separate underwater platform;
      determine a distance between the two underwater platforms;
      propagate sonar waves from the sonar system to image a feature in the underwater environment; and
      direct processing of sonar images from each of the at least two underwater platforms with a graphics processor to generate a stereoscopic image of the underwater feature.

17. The platform of claim 16, wherein the computer control is further configured to process sonar images using a graphics processor on a one of the at least two underwater platforms.

18. The platform of claim 17, wherein the computer control is further configured to process graphics on a one of the at least two underwater platforms at a first resolution.

19. The platform of claim 18, the computer control is further configured to control stitching together of multiple sonar images using identifiable overlapping features of the underwater feature.

20. The platform of claim 16, wherein the platform is an autonomous underwater vehicle.

\* \* \* \* \*